United States Patent
Sakakibara

(10) Patent No.: US 8,164,621 B2
(45) Date of Patent: Apr. 24, 2012

(54) IMAGE DISPLAY DEVICE

(75) Inventor: Masahiro Sakakibara, Hoi-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 603 days.

(21) Appl. No.: 12/382,931

(22) Filed: Mar. 26, 2009

(65) Prior Publication Data
US 2009/0244407 A1 Oct. 1, 2009

(30) Foreign Application Priority Data
Mar. 31, 2008 (JP) ................... 2008-094168

(51) Int. Cl.
*H04N 5/253* (2006.01)
*H04N 1/04* (2006.01)
(52) U.S. Cl. .............. 348/78; 348/77; 358/474
(58) Field of Classification Search .............. 348/61–62, 348/77–78, 739, 744, 758–759; 358/471, 358/474
See application file for complete search history.

(56) References Cited

U.S. PATENT DOCUMENTS

| 6,169,563 | B1 | 1/2001 | Doi | |
| 6,278,476 | B1 | 8/2001 | Ueno | |
| 7,826,110 | B2* | 11/2010 | Tanabe et al. | 358/509 |
| 2003/0035451 | A1 | 2/2003 | Ishida et al. | |
| 2007/0013688 | A1* | 1/2007 | Sakaue | 345/204 |
| 2007/0159599 | A1* | 7/2007 | Yamada | 351/211 |

FOREIGN PATENT DOCUMENTS

| JP | A 7-147446 | 6/1995 |
| JP | A 2000-190563 | 7/2000 |
| JP | A 2003-60289 | 2/2003 |
| JP | A 2004009492 | 1/2004 |
| JP | A-2005-86055 | 3/2005 |
| JP | A-2005-181924 | 7/2005 |

* cited by examiner

*Primary Examiner* — Joshua Joo
(74) *Attorney, Agent, or Firm* — Oliff & Berridge, PLC

(57) ABSTRACT

An image display device includes an optical scanning part, a drive control part which supplies an electric current to lasers, and a light detecting part. The drive control part supplies an electric current to the lasers while changing a current value at two points or more when a scanning position of the light scanned by the optical scanning part is at a predetermined position outside an effective scanning range. Based on intensity of an inspection-use light detected by the light detecting part, current-light emitting quantity characteristics of the lasers are calculated, and electric currents supplied to the lasers are adjusted based on a result of the calculation.

9 Claims, 6 Drawing Sheets

IMAGE DISPLAY DEVICE

CROSS-REFERENCE TO RELATED APPLICATION(S)

This application is based on and claims the benefit of priority from Japanese Patent Application No. 2008-094168 filed on Mar. 31, 2008; the entire contents of which are incorporated herein by reference.

BACKGROUND

1. Field

The present invention relates to an image display device, and more particularly to an optical-scanning-type image display device which displays an image by performing two-dimensional scanning of an image forming light radiated from a light source.

2. Description of the Related Art

Conventionally, there has been known an optical-scanning-type image display device which displays an image by performing two-dimensional scanning of an image forming light which is generated based on an image signal.

As such an image display device, there has been known an image display device which includes a light source part having a light source which radiates a light having intensity corresponding to a supplied electric current, an optical scanning part which performs two-dimensional scanning of the light radiated from the light source of the light source part, and a drive control part which sequentially supplies the electric current of magnitude corresponding to an image signal to the light source when a scanning position taken in the scanning operation performed by the optical scanning part falls within an effective scanning range (see JP-A-2004-9492, for example).

When a semiconductor laser diode or the like, for example, is used as the light source of the light source part, the light source hardly emits light when a current value is equal to or below a threshold current value. Accordingly, a DC bias current having the threshold current value is supplied to the semiconductor laser element which constitutes the light source, and a pulse current on which an electric current corresponding to an image signal is superposed is made to flow in the DC bias current thus allowing the semiconductor laser element to emit a light.

However, the threshold current value of the light source is changed attributed to heat generated when the light source of the light source part radiates the light, a change of ambient temperature or the like. When the threshold current value of the light source is changed in this manner, the current-light emission quantity characteristic of the light source is changed thus giving rise to a drawback that the brightness of a display image becomes unstable.

Accordingly, as a technique which keeps an optical output of the light source part constant, JP-A-7-147446 discloses a following technique. That is, in an optical fiber module, a light source part includes a light source and a light detecting part, a current value supplied to the light source is changed at two points or more, an optical output of the light source is detected by the light detecting part of the light source part, a current-light emission quantity characteristic (a threshold current value or quantum efficiency of a light source, for example) of the light source is detected based on a result of the detection thus setting a bias current supplied to the light source and supplying a pulse current corresponding to the current-light emission quantity characteristic of the light source to the light source.

SUMMARY

However, in the image display device, the light radiated from the light source of the light source part is scanned by the optical scanning part after passing a plurality of optical systems such as an optical fiber, lenses and mirrors and being transferred to the optical scanning part. Accordingly, the intensity of the light shows a loss due to a coupling efficiency of the optical fiber, the reflectance of the mirror and the like during such a light transmission process. Further, the loss of intensity of the light caused in an optical path from the light source part to the optical scanning part where scanning is performed is changed also attributed to a change of ambient temperature or the like. Further, also when a position of the optical element is displaced due to an external factor or the like, the loss of intensity of the light in the optical path from the light source part to the optical scanning part is changed.

Accordingly, to consider a case in which the above-described technique which keeps the optical output of the light source part constant is applied to the image display device, although the optical output of the light source part may be made stable, when the loss of intensity of the light in the optical path from the light source part to the optical scanning part where scanning is performed is changed, the intensity of the light outputted from the optical scanning part is also changed thus making brightness of a display image unstable. Accordingly, the image display device cannot maintain the stable image quality.

According to one aspect of the present invention, there is provided an image display device displaying an image by a scanned light which includes: a light source part which includes a light source for radiating a light having intensity corresponding to a supplied electric current; an optical scanning part which is configured to perform two-dimensional scanning of the light radiated from the light source; a drive control part which is configured to sequentially supply an electric current corresponding to an image signal to the light source when a scanning position of the light by the optical scanning part falls within an effective scanning range so as to allow the light source to sequentially radiate image forming light therefrom, and is also configured to supply an electric current to the light source when the scanning position of the light by the optical scanning part falls at a predetermined position outside the effective scanning range so as to allow the light source to radiate inspection-use light therefrom; a light detecting part which is arranged at a predetermined position within a scanning range of the light by the optical scanning part and outside the effective scanning range; and a light blocking part which is configured to block the inspection-use light passing surroundings of the light detecting part out of the inspection-use light scanned by the optical scanning part, wherein the drive control part is configured to supply the electric current to the light source by changing a current value at two points or more when the scanning position of the light by the optical scanning part falls at the predetermined position outside the effective scanning range, is configured to calculate a current-light emission quantity characteristic of the light source based on intensity of the inspection-use light detected by the light detecting part at a point of time of supplying the electric current to the light source, and is configured to adjust the electric current supplied to the light source based on a result of the calculation.

DETAILED DESCRIPTION

Hereinafter, an image display device of a preferred embodiment of the present invention is explained in conjunction with attached drawings. Hereinafter, the explanation will be made mainly with respect to a retinal-scanning-type image display device which includes a light source part having a light source which radiates light having intensity corresponding to a supplied electric current, and an optical scanning part which performs two-dimensional scanning of the light radiated from the light source, wherein an image is displayed on a retina by projecting an image forming light scanned by the optical scanning part to at least one of retinas of a viewer. However, the present invention is not limited to such a retinal-scanning-type image display device, and is also applicable to other image display devices. That is, for example, the present invention is applicable to an image projecting device which displays an image by projecting an image forming light obtained by scanning using an optical scanning part on a screen, and other image display devices which display an image due to scanning of light.

[1. Summary of Image Display Device]

Figure 1:
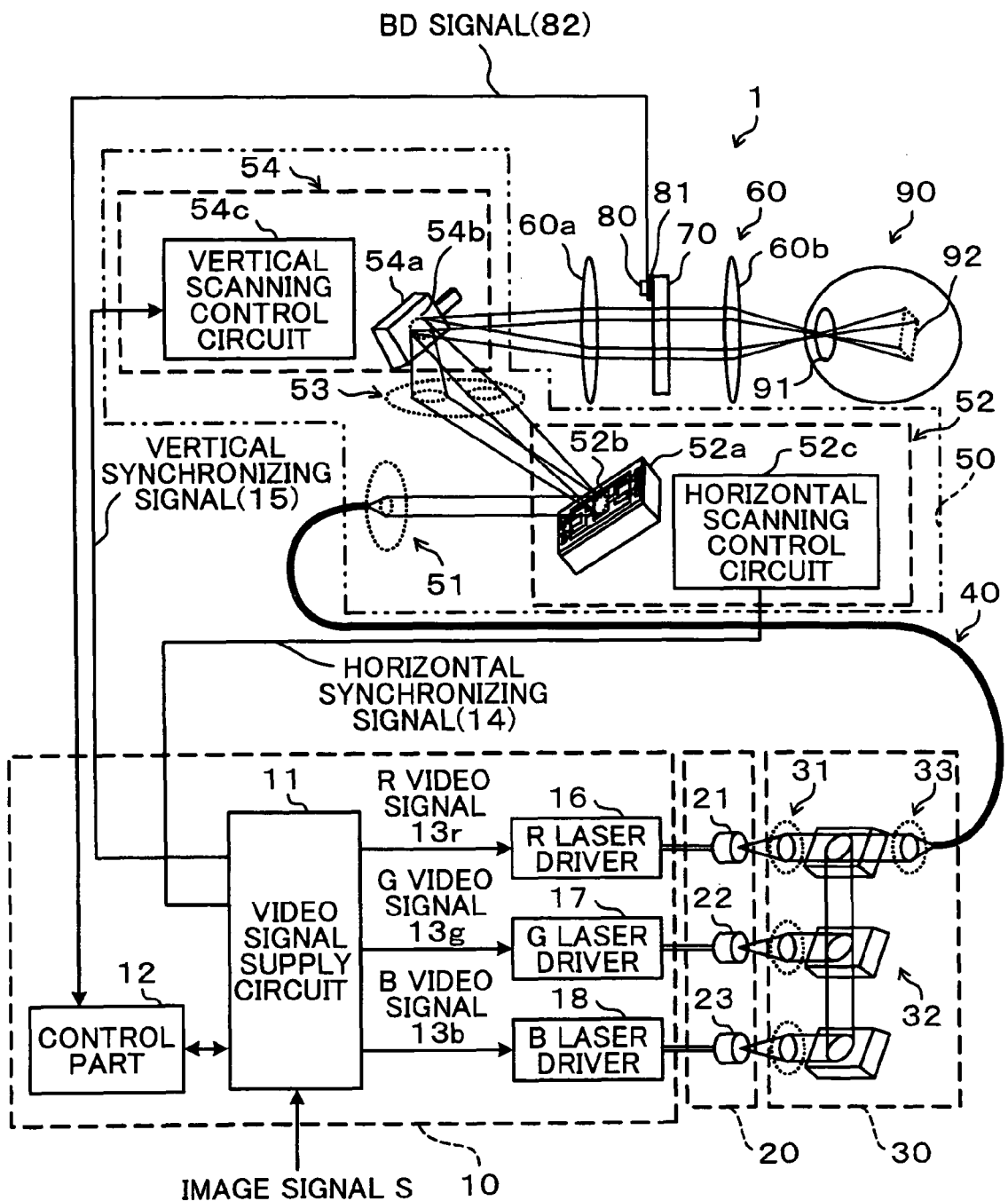
FIG. 1 is an explanatory view showing an image display device of an embodiment of the present invention.
Figure 2A:
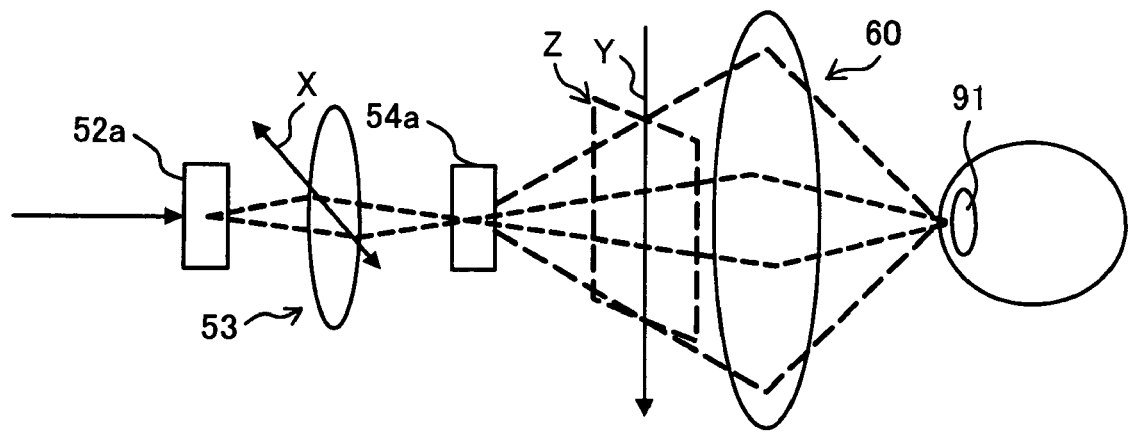
FIG. 2A and FIG. 2B are views for explaining a scanning mode of laser beams performed by an optical scanning part of the image display device of this embodiment.
Figure 2B:
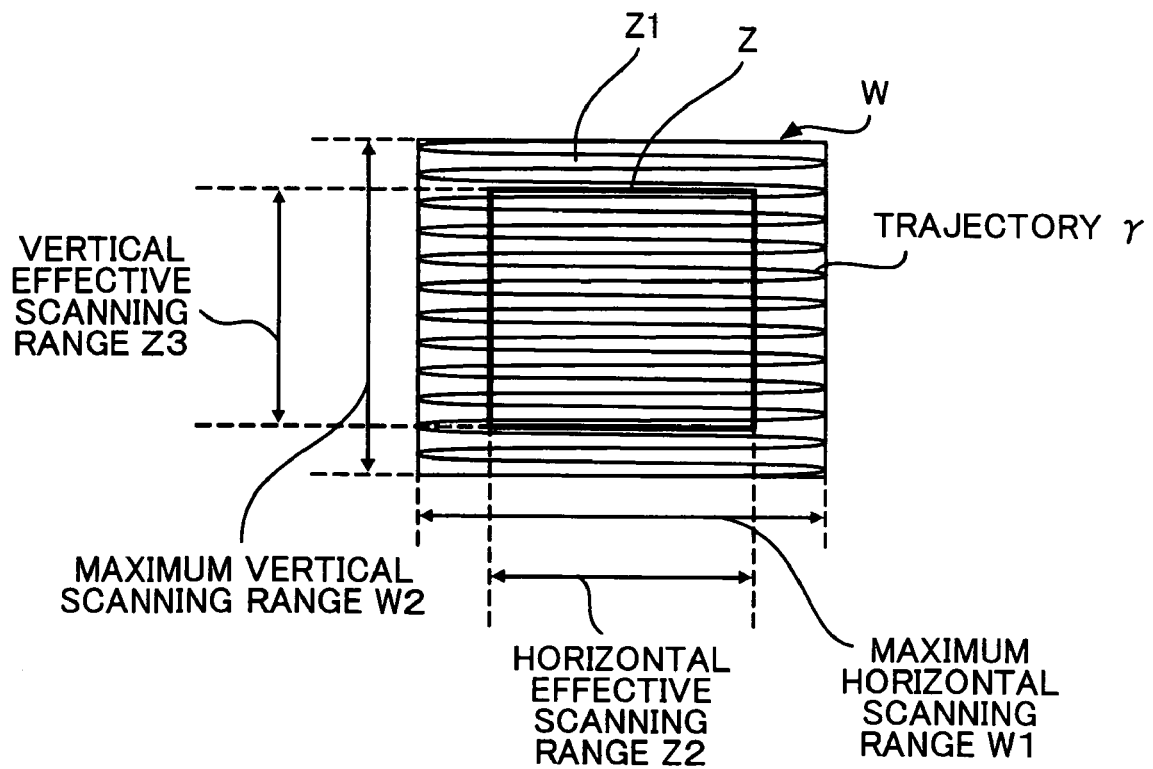

The constitution of a retinal-scanning-type image display device 1 (hereinafter referred to as "image display device 1") of this embodiment is explained in conjunction with FIG. 1. FIG. 1 is an explanatory view showing the image display device 1 of this embodiment. FIG. 2A and FIG. 2B are views for explaining a scanning mode of laser beams using an optical scanning part of the image display device 1.

As shown in FIG. 1, the image display device 1 of this embodiment includes a drive control part 10, a light source part 20, a light synthesizing part 30, an optical fiber 40, an optical scanning part 50, and a relay optical system 60.

The drive control part 10 includes a video signal supply circuit 11 for generating respective signals which constitute elements for synthesizing an image based on an image signal S inputted from the outside, a control part 12 which adjusts intensity of light or the like radiated from the light source part 20 by controlling the video signal supply circuit 11, an R laser driver 16, a G laser driver 17 and a B laser driver 18.

The respective laser drivers 16, 17, 18 drive the light source part 20 such that the light source part 20 radiates laser beams of respective colors whose intensities are respectively modulated based on respective video signals 13r, 13g, 13b of red (R), green (G), blue (B) transmitted from the video signal supply circuit 11 as video signals.

The light source part 20 includes, as a plurality of light sources corresponding to three primary colors respectively, an R laser 21 which radiates laser beams of red (R), a G laser 22 which radiates laser beams of green (G) and a B laser 23 which radiates laser beams of blue (B).

These R laser 21, G laser 22 and B laser 23 function as light sources which radiate laser beams of intensities corresponding to values of electric currents (drive currents) supplied from the R laser driver 16, the G laser driver 17 and the B laser driver 18. For example, these laser drivers may be constituted of a semiconductor laser or a solid laser having a harmonic wave generating mechanism. When the semiconductor laser is used as the laser, the intensity of laser beams can be modulated by directly modulating a drive current, while when the solid laser is used as the laser, it is necessary to modulate the intensity of laser beams by providing an external modulator to each laser.

The light synthesizing part 30 includes collimate optical systems 31 which collimates laser beams radiated from the respective lasers 21, 22, 23 into parallel lights respectively, dichroic mirrors 32 which synthesize the respective collimated laser beams, and a coupling optical system 33 which guides the synthesized laser beams to the optical fiber 40.

The optical scanning part 50 includes a collimate optical system 51 which guides the laser beams transmitted from the light source part 20 via the light synthesizing part 30 and the optical fiber 40 to a horizontal scanning part 52, the horizontal scanning part 52 which scans the laser beams collimated by the collimate optical system 51 in a horizontal direction by making use of a scanning element 52a, a relay optical system 53 which guides the laser beams scanned by the horizontal scanning part 52 to a vertical scanning part 54, and the vertical scanning part 54 which scans laser beams scanned by the horizontal scanning part 52 and incident thereon via the relay optical system 53 in a vertical direction by making use of a scanning element 54a.

In the optical scanning part, the horizontal scanning part 52 functions as a high-speed scanning part which performs relatively high-speed horizontal scanning of laser beams with respect to the horizontal direction which constitutes a first scanning direction for every 1 scanning line of an image to be displayed, and includes the scanning element 52a which performs scanning of laser beams in the horizontal direction using a reflective surface 52b, and a horizontal scanning control circuit 52c which performs a drive control of the scanning element 52a.

Further, in the optical scanning part, the vertical scanning part 54 is configured to perform scanning of laser beams in a second scanning direction which is a direction intersecting the first scanning direction or orthogonal to the first scanning direction. The vertical scanning part 54 functions as a low-speed scanning part which performs relatively low-speed vertical scanning of laser beams with respect to the vertical direction which constitutes the second scanning direction from the first horizontal scanning line to the last horizontal scanning line for every 1 frame of the image to be displayed.

The vertical scanning part 54 includes the scanning element 54a which performs scanning of laser beams incident thereon via the relay optical system 53 in the vertical direction using a reflective surface 54b, and a vertical scanning control circuit 54c which performs a drive control of the scanning element 54a.

The horizontal scanning control circuit 52c is connected to the video signal supply circuit 11, and oscillates the reflective surface 52b of the scanning element 52a in synchronism with a horizontal synchronizing signal 14 outputted from the video signal supply circuit 11. Further, the vertical scanning control circuit 54c is connected to the video signal supply circuit 11, and oscillates the reflective surface 54b of the scanning element 54a in synchronism with a vertical synchronizing signal 15 outputted from the video signal supply circuit 11.

Further, in the image display device 1 of this embodiment, an image is formed in accordance with every frame period by performing two-dimensional scanning of laser beams incident on the optical scanning part 50 from the light source part 20 via the light synthesizing part 30 and the optical fiber 40 in the first scanning direction and the second scanning direction substantially orthogonal to the first scanning direction using the horizontal scanning part 52 and the vertical scanning part 54 which the optical scanning part 50 possesses.

That is, as shown in FIG. 2A, the scanning element 52a which performs the relatively high-speed oscillations is oscillated by the horizontal scanning control circuit 52c so as to perform the reciprocating scanning of incident laser beams with respect to the horizontal direction X. Then, the laser beams which are scanned in the horizontal direction by the scanning element 52a are incident on the vertical scanning part 54 via the relay optical system 53. The scanning element 54a of the vertical scanning part 54 is oscillated in a sawtooth waveform by the vertical scanning control circuit 54c such that the incident laser beams are scanned with respect to the vertical direction Y. The laser beams which are scanned in the vertical direction by the scanning element 54a and fall within an effective scanning range Z are incident on a pupil 91 of a viewer via the relay optical system 60.

FIG. 2B shows the relationship between a maximum scanning range W of the scanning element 52a and the scanning element 54a (a range formed by a maximum horizontal scanning range W1 and a maximum vertical scanning range W2) and an effective scanning range Z (a range formed by a horizontal effective scanning range Z2 and a vertical effective scanning range Z3). Here, "maximum scanning range" implies a maximum range that the scanning element 52a and the scanning element 54a can scan the light.

Within the maximum scanning range W of the scanning element 52a and the scanning element 54a, due to the radiation of laser beams (hereinafter referred to as "image forming light") whose intensity is modulated corresponding to an image signal S from the light source part 20 at timing that the scanning position falls within the effective scanning range Z, the image forming light is scanned in the effective scanning range Z by the horizontal scanning part 52 and the vertical scanning part 54. Accordingly, the image forming light for 1 frame is scanned. This scanning is repeated for every image of 1 frame. In FIG. 2B, a trajectory γ of the laser beams scanned by the horizontal scanning part 52 and the vertical scanning part 54 assuming that the laser beams are constantly radiated from the light source part 20 is shown virtually. Further, in the explanation made hereinafter, a range Z1 excluding the effective scanning range Z within the maximum scanning range W is referred to as "ineffective scanning range Z1" (see FIG. 2B).

Here, the scanning element 52a of the horizontal scanning part 52 and the scanning element 54a of the vertical scanning part 54 are respectively constituted of a Galvano mirror, for example. Provided that laser beams are scanned by oscillating the reflective surfaces 52b, 54b about axes of the reflective surfaces 52b, 54b, the scanning elements 52a, 54a may adopt any one of driving methods including piezoelectric driving, electromagnetic driving, electrostatic driving and the like. Further, the scanning element 54a may be formed of a polygon mirror.

The relay optical system 60 is, as shown in FIG. 1, constituted of a first lens 60a and a second lens 60b, wherein the relay optical system 60 converges the laser beams which constitute the image forming light scanned by the optical scanning part 50, and allows the converged laser beams to be incident on an eye 90 of a viewer through a pupil 91.

Here, the drive control part 10 sequentially supplies drive currents corresponding to the image signals S to the lasers 21, 22, 23 when the scanning position of the optical scanning part 50 falls within the effective scanning range Z, and allows the image forming light to be sequentially outputted from the laser 21, 22, 23. Accordingly, the image forming light is incident on the optical scanning part 50 via the light synthesizing part 30 and the optical fiber 40, and the two-dimensional scanning of the image forming light is performed by the optical scanning part 50 within the effective scanning range Z. Then, the image forming light to which the two-dimensional scanning is applied by the optical scanning part 50 is incident on the eye 90 of the viewer from the pupil 91 via the relay optical system 60 so that the image forming light is projected on the retina 92. Accordingly, the viewer can recognize an image formed by the image forming light which is projected on the retina 92.

Further, the laser beams scanned by the optical scanning part 50 are converged by a first lens 60a of the relay optical system 60 and an intermediate image plane is formed between the first lens 60a and a second lens 60b. Then, a pupil enlarging element 70 which divides or diffuses the incident laser beams is arranged on the intermediate image plane formed in the relay optical system 60. The pupil enlarging element 70 is constituted of, for example, a diffraction element (diffraction grid or the like), and the incident laser beams are separated into a plurality of diffracted lights forming multiple optical fluxes by the pupil enlarging element 70. Due to such constitution, an effective diameter of laser beams incident on the eye 90 of the viewer is enlarged. That is, an exit pupil is enlarged.

Further, the image display device 1 of this embodiment is also provided with a light detecting part 80 described later which is arranged at a predetermined position outside the effective scanning range Z within the maximum scanning range W of the optical scanning part 50, and detects an inspection-use light which is scanned outside the effective scanning range Z. In FIG. 1, the light detecting part 80 is configured to be arranged in an ineffective scanning range Z1 formed above the effective scanning range Z. However, the arrangement of the light detecting part 80 is not limited to such a place. For example, the light detecting part 80 may be configured to be arranged in an ineffective scanning range Z1 formed below the effective scanning range Z, or may be configured to be arranged in an ineffective scanning range Z1 formed above the effective scanning range Z as well as in an ineffective scanning range Z1 formed below the effective scanning range Z.

The light detecting part 80 is configured to output a voltage corresponding to intensity of the received inspection-use light to the control part 12 as a BD signal 82, and the control part 12 is configured to adjust the intensity of laser beams outputted from the light source part 20 based on the BD signal 82.

Further, the image display device 1 includes a light blocking part 81 for blocking the inspection-use light which passes the surroundings of the light detecting part 80 out of the inspection-use light scanned by the optical scanning part 50 at a position outside the effective scanning range Z.

[2. Adjustment of Light Source Part 20]

Next, the adjustment of the light source part 20 based on the inspection-use light detected by the light detecting part 80 is explained specifically. Hereinafter, the adjustment of the light source part 20 is specifically explained in order of the characteristic of the light source part 20, the arrangement of the light detecting part 80 and the light blocking part 81, and an adjustment operation of the light source part 20 by the drive control part 10 in conjunction with drawings.

[2.1. Characteristic of Light Source Part]

Figure 3:
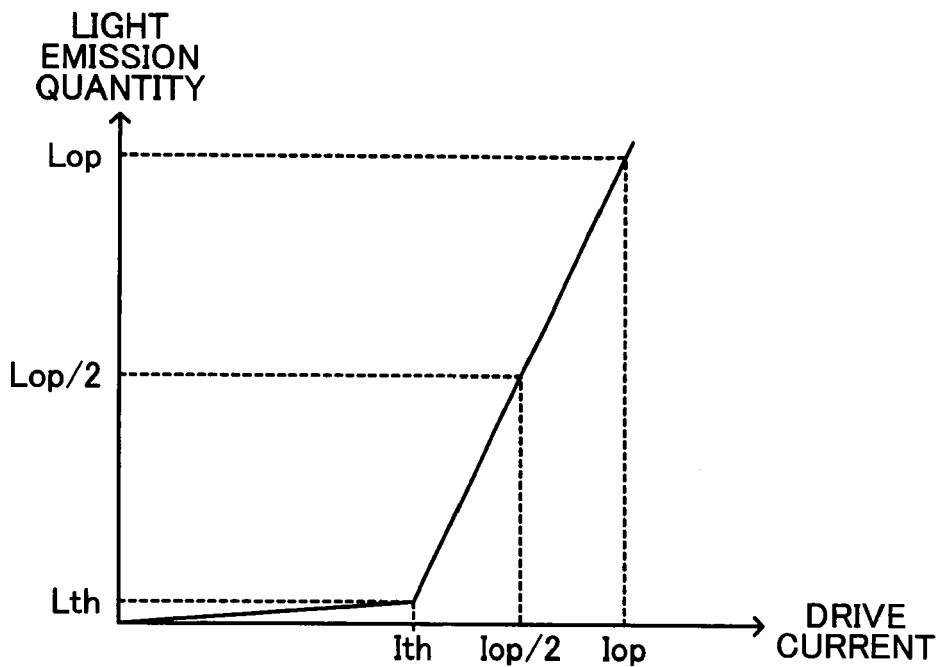
FIG. 3 is a graph showing the relationship between a drive current supplied to a light source of the image display device of this embodiment and light emission quantity of the light source.
Figure 4:
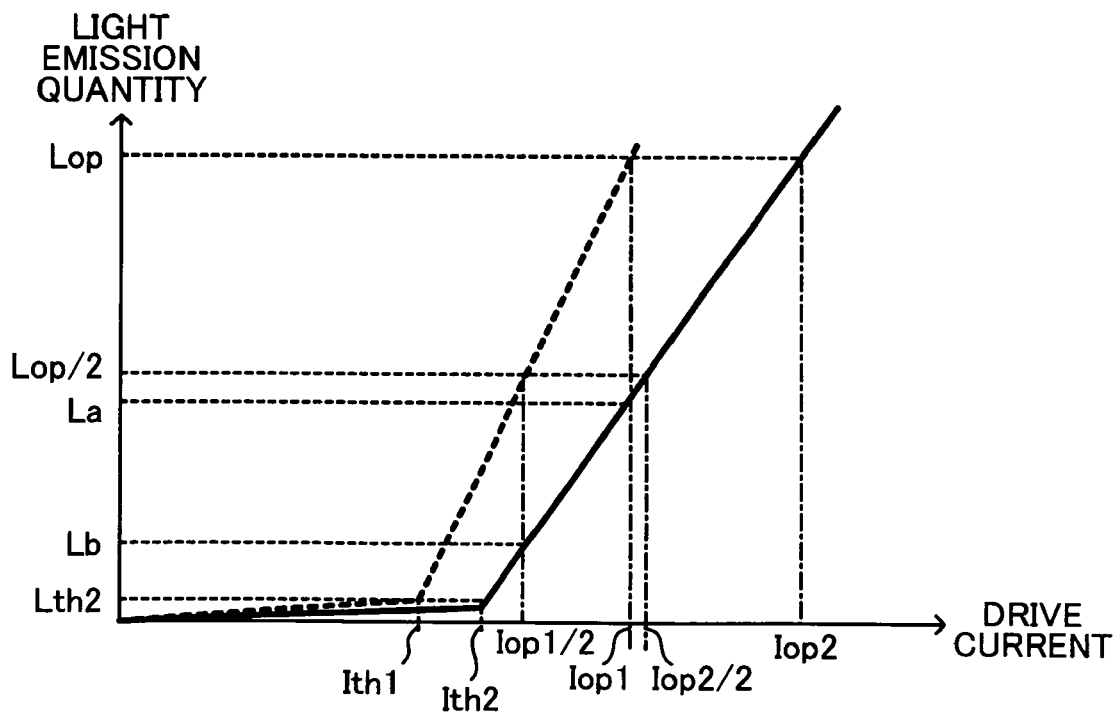
FIG. 4 is a graph showing the relationship between a drive current supplied to the light source of the image display device of this embodiment and light emission quantity of the light source.

First of all, the characteristic of each laser 21, 22, 23 which constitutes the light source is explained in conjunction with drawings. FIG. 3 and FIG. 4 are views showing the relationship between a drive current supplied to the light source (each laser 21, 22, 23) of the image display device 1 of this embodiment and a light emission quantity of the light source (electric current of light source-light emission quantity characteristic), wherein the light emission quantity is taken on an axis of ordinates and a drive current value is taken on an axis of abscissas respectively.

As shown in FIG. 3, each laser 21, 22, 23 has the characteristic in which the light emission quantity sharply rises when the drive current which exceeds an intrinsic threshold current value Ith is supplied, and the light emission quantity until the drive current reaches the threshold current value Ith is hardly recognized and a change of the light emission quantity is also hardly recognized. Accordingly, the drive control part 10 of the image display device 1 is configured to radiate the image forming light for displaying an image from each laser 21, 22, 23 by supplying the drive current which exceeds the threshold current value Ith to each laser 21, 22, 23.

Each laser 21, 22, 23 is formed of the semiconductor laser as described above and hence, the laser 21, 22, 23 contains a capacitance component whereby there arises a delay time until the laser 21, 22, 23 emits light after the supply of the drive current exceeding the threshold current value Ith starts. To suppress this delay of light emission, a bias current Ib having the threshold current value Ith is supplied to the respective lasers 21, 22, 23 before the light emission so as to increase the responsiveness of the respective lasers 21, 22, 23.

In the image display device 1 of this embodiment, to ensure the proper display of an image which a viewer observes, a maximum value of intensity of light incident on the eye 90 of the viewer is prescribed. Here, the light emission quantity of the lasers 21, 22, 23 for acquiring the light having the maximum-value intensity is defined as Lop as shown in FIG. 3 and the current value to be supplied to the laser 21, 22, 23 necessary for the acquisition of the light having the maximum-value intensity (hereinafter referred to as "maximum current value") is defined as Iop.

The light emission characteristic of the laser 21, 22, 23 is changed attributed to heat generated when the laser beams are radiated, a change of ambient temperature or the like. For example, the light emission characteristic of the laser 21, 22, 23 is changed from a characteristic indicated by a broken line in FIG. 4 to a characteristic indicated by a solid line in FIG. 4 attributed to the temperature change. That is, the threshold current value Ith is increased to Ith2 from Ith1. Further, the maximum current value Iop is also increased to Iop2 from Iop1.

Accordingly, to ensure the proper display of an image which the viewer observes, it is necessary to adjust the electric currents to be supplied to the lasers 21, 22, 23 corresponding to the change of the light emission characteristics of the lasers 21, 22, 23.

The light emission characteristic of the laser 21, 22, 23 has the linearity in a region where the drive current is equal to or more than the threshold current value Ith and hence, by measuring two or more points in this region, it is possible to detect the threshold current value Ith and the maximum current value Iop as the current-light emission quantity characteristic of the laser 21, 22, 23.

For example, when the light emission characteristic of the laser 21, 22, 23 is changed from the characteristic indicated by the broken line in FIG. 4 to the characteristic indicated by the solid line in FIG. 4 attributed to the temperature change, by supplying the maximum current value Iop1 in the characteristic indicated by the broken line and the drive current of the current value Iop1/2 which is one half of the maximum current value Iop1 to the laser 21, 22, 23, the light emission quantity of the laser 21, 22, 23 takes La and Lb. Here, it is possible to obtain inclination θ of the characteristic indicated by the solid line after change by calculating a following formula (1). Here, the explanation is made by assuming that the lasers 21, 22, 23 have the same characteristic.

$$\theta = \tan^{-1}[(La-Lb)/(Iop1-Iop\tfrac{1}{2})] \qquad (1)$$

Then, to assume that the light emission quantity Lth2 at the threshold current value Ith2 is small enough to be ignored, the threshold current value Ith2 of the characteristic indicated by the solid line after change can be approximately expressed by a following formula (2).

$$Ith2 \approx Iop1 - La/\tan\theta \qquad (2)$$

Using the above-described formulae (1) and (2), the maximum current value $I_{op}2$ of the characteristic indicated by a solid line after the change can be approximately expressed by a following formula (3).

$$Iop2 \approx (Lop/\tan\theta) + Ith2 \qquad (3)$$

In this manner, by supplying the drive current to the laser 21, 22, 23 while changing the current value at two points or more, even when the characteristic is changed attributed to the temperature change or the like, the threshold current value Ith and the maximum current value Iop can be detected as the current-light emission quantity characteristic of the laser 21, 22, 23.

The above-mentioned calculation is merely an example, and the threshold current value Ith and the maximum current value Iop may be detected by other calculations.

[2.2. Arrangement of Light Detecting Part and Light Blocking Part]

Figure 5:
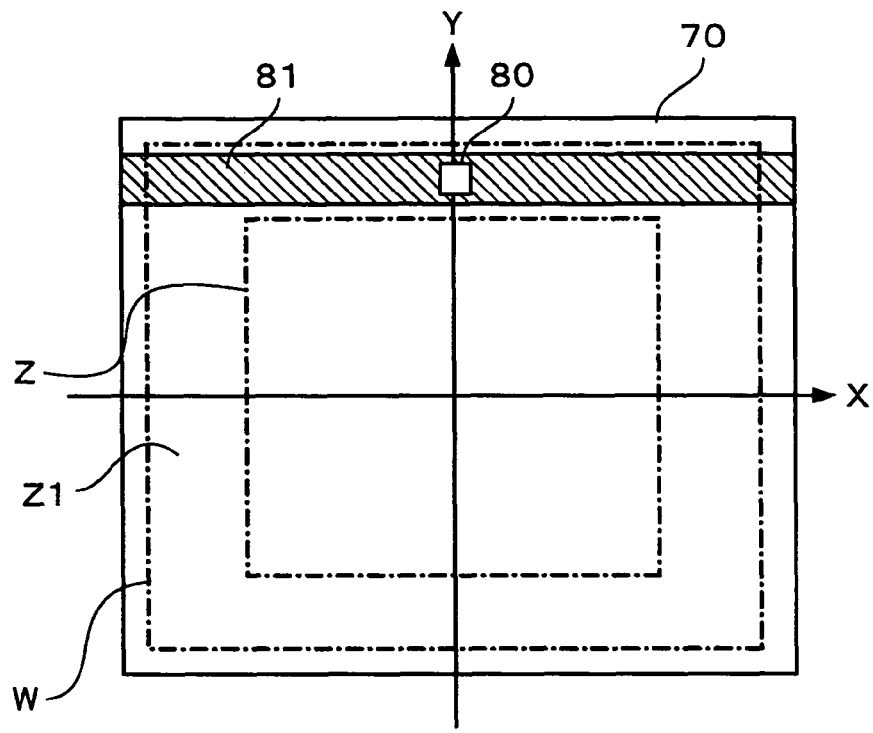
FIG. 5 is a view showing the arrangement of a light detecting part and a light blocking part of the image display device of this embodiment.
Figure 6:
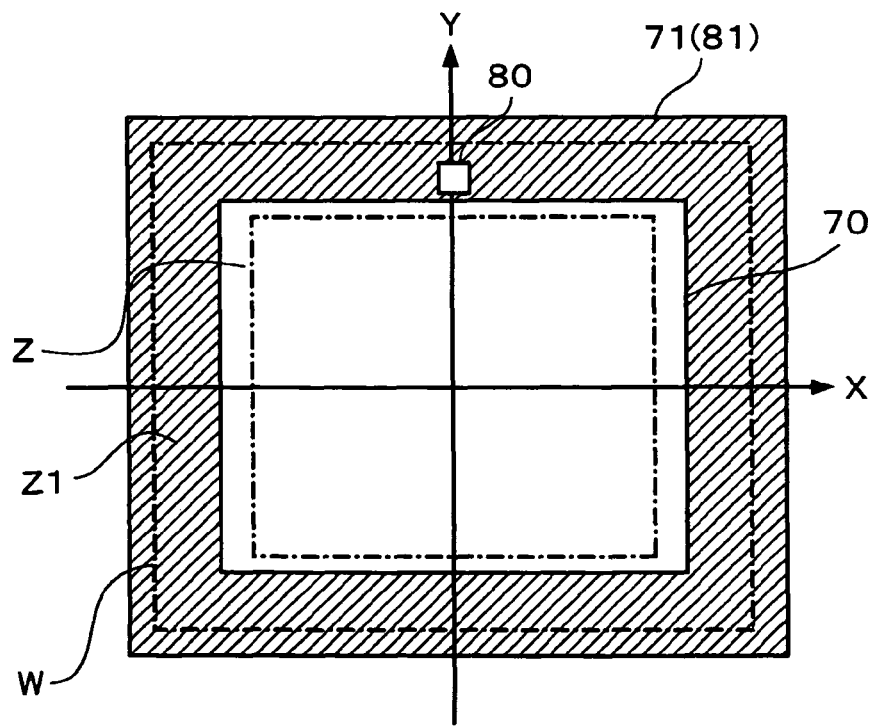
FIG. 6 is a view showing another arrangement of the light detecting part and the light blocking part of the image display device of this embodiment.

Next, the arrangement of the light detecting part 80 and the light blocking part 81 is specifically explained in conjunction with the drawings. FIG. 5 is a view showing the arrangement of the light detecting part and the light blocking part, and FIG. 6 is a view showing another arrangement of the light detecting part and light blocking part.

The laser beams radiated from the lasers 21, 22, 23 of the light source part 20 pass the optical fiber 40 and the plurality of optical systems and are scanned by the optical scanning part 50. Accordingly, in the course of such scanning, a loss occurs in the intensity of light attributed to coupling efficiency of the optical fiber 40, reflectance of the reflective surfaces 52*b*, 54*b* and the like. Further, the loss of intensity of light in the optical path from the lasers 21, 22, 23 to the optical scanning part 50 where the scanning is performed is also changed attributed to the change of the ambient temperature or the like. Further, also when the positional displacement of the optical element occurs due to an external factor or the like, the loss of intensity of light in the optical path from the lasers 21, 22, 23 to the optical scanning part 50 is changed.

Further, in the image display device 1 of this embodiment, instead of directly detecting the light emission quantities of the lasers 21, 22, 23 using the light detecting part provided to the light source part 20, the light emission quantities of the lasers 21, 22, 23 are detected by providing the light detecting part 80 at a position where the intensity of the laser beams scanned by the optical scanning part 50 is detected. Then, the drive currents supplied to the lasers 21, 22, 23 of the light source part 20 are adjusted so as to set the laser beams detected by the light detecting part 80 constant.

The change of the current-light emission quantity characteristic of the laser 21, 22, 23 particularly occurs during the operation of the laser 21, 22, 23, that is, in a state that the optical scanning part 50 performs the two-dimensional scanning of the image forming light so as to allow a viewer to recognize an image. Accordingly, the drive control part 10 is configured to radiate the laser beams (inspection-use light) detected by the light detecting part 80 from the laser 21, 22, 23 when the scanning position of the optical scanning part 50 falls at a predetermined position within the ineffective scanning range Z1 outside the effective scanning range Z.

As shown in FIG. 5, the light detecting part 80 is mounted on the pupil enlarging element 70 which is arranged on the intermediate image plane formed in the relay optical system 60. The reason the light detecting part 80 is mounted on the pupil enlarging element 70 is that the positioning and the fixing of the light detecting part 80 are facilitated. Here, the light detecting part 80 may be mounted in the pupil enlarging element 70.

Further, the light detecting part 80 is arranged in an upper portion of the range outside the effective scanning range Z within which the scanning position of the optical scanning part 50 falls (ineffective scanning range Z1). In this manner, by providing the light detecting part 80 above the effective scanning range Z, it is possible to detect the inspection-use light by the light detecting part 80 before the image forming light is scanned in the effective scanning range Z. Accordingly, the intensity of laser beams radiated from the light source part 20 can be adjusted before the scanning of the effective scanning range Z and hence, an image can be displayed by the laser beams to which the intensity adjustment is already applied. Here, although the optical scanning part 50 is arranged in an upper portion of the ineffective scanning range Z1, the optical scanning part 50 may be arranged in a lower portion of the ineffective scanning range Z1. Further, although the optical scanning part 50 is arranged at the center of the ineffective scanning range Z1, the optical scanning part 50 may be arranged on a right side or a left side of the ineffective scanning range Z1.

Between the pupil enlarging element 70 and the light detecting part 80, the light blocking part 81 which blocks the inspection-use light passing the surroundings of the light detecting part 80 out of the inspection-use light scanned by the optical scanning part 50 is provided. The light blocking part 81 is arranged to prevent the inspection-use light from the lasers 21, 22, 23 from being incident on the eye 90 of the viewer when the radiation timing of the inspection-use light from the lasers 21, 22, 23 is displaced. Accordingly, a size of the light blocking part 81 is set by taking at least a maximum value of the displacement of timing of the inspection-use light into consideration. In the example shown in FIG. 5, the light blocking part 81 having a width equal to the maximum horizontal scanning range W1 and a length larger than a length of the light detecting part 80 also in the vertical direction is arranged above the ineffective scanning range Z1.

Here, when a peripheral portion of the light detecting part 80 outside a photoelectric conversion element which actually detects the inspection-use light has a certain degree of area or more, the peripheral portion of the photoelectric conversion element of the light detecting part 80 may be used as the light blocking part 81 without providing the light blocking part 81 separately.

Further, the light detecting part 80 may be, as shown in FIG. 6, mounted on a frame body 71 which allows a periphery of the pupil enlarging element 70 arranged on the intermediate image plane formed in a relay optical system 60 to be fitted therein. By mounting the light detecting part 80 on the frame body 71 which fixes the pupil enlarging element 70, the positioning and the fixing of the light detecting part 80 are facilitated. The frame body 71, as shown in FIG. 6, has an opening portion for fitting the pupil enlarging element 70 therein. Although the opening portion is formed in a shape slightly larger than the effective scanning range Z, the opening may have the same size as the effective scanning range Z.

Further, by imparting light blocking property to the frame body 71 so as to prevent the transmission of laser beams therethrough, the frame body 71 may be configured to function also as the light blocking part 81 which blocks the inspection-use light passing the periphery of the light detecting part 80 out of the inspection-use light scanned by the optical scanning part 50. Due to such constitution, the light detecting part 80 can be easily assembled compared to a case in which the light blocking part 81 is separately provided.

[2.3. Adjustment Operation of Light Source Part by Drive Control Part]

Figure 7:
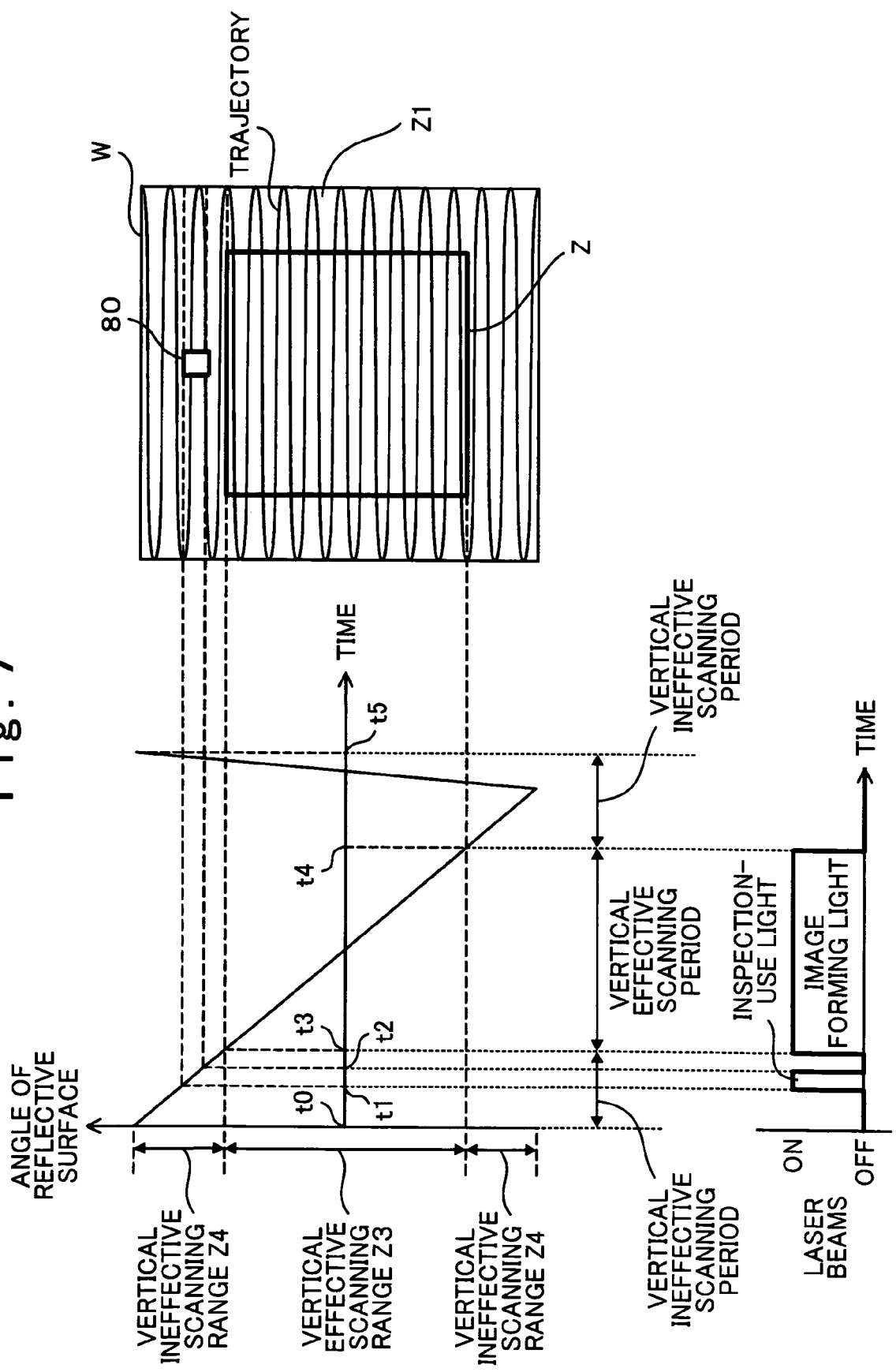
FIG. 7 is a view for explaining radiation timing of inspection-use light used in this embodiment.
Figure 8:
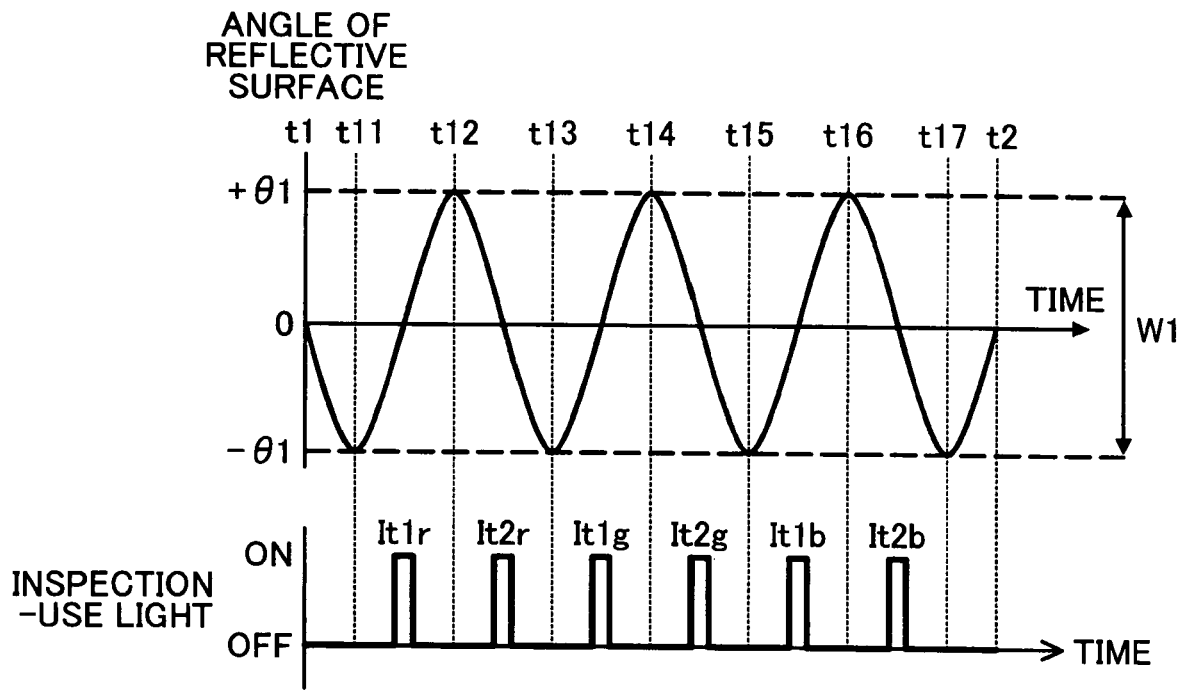
FIG. 8 is a view for explaining radiation timing of inspection-use light used in this embodiment.
Figure 9:
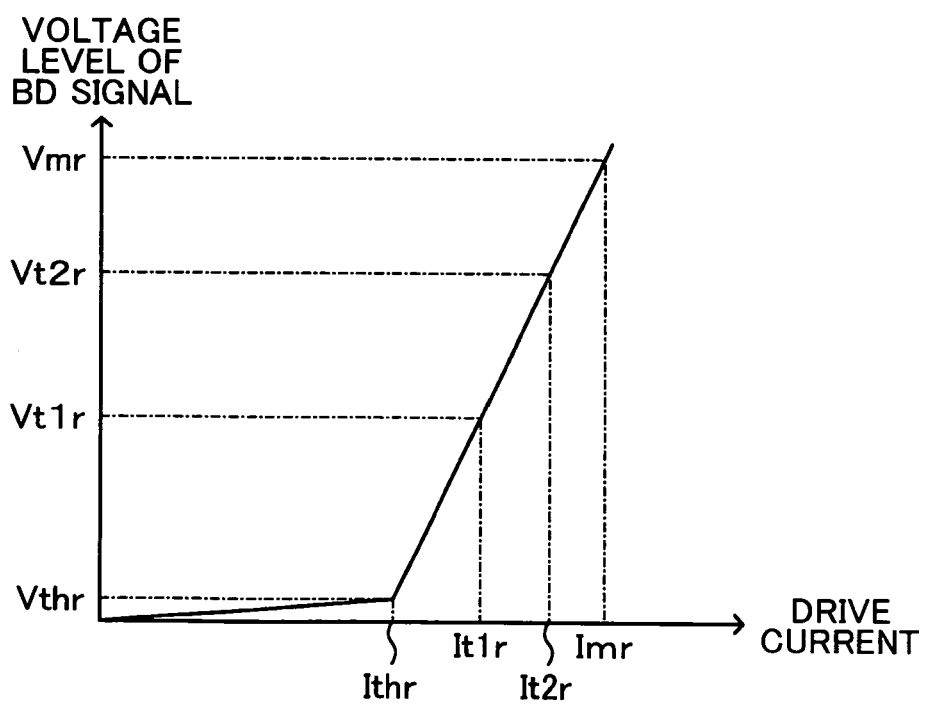
FIG. 9 is a view for explaining a method of adjusting a drive current supplied to a light source part of the image display device of this embodiment.

Next, the adjustment operation of the light source part 20 by the drive control part 10 is explained. FIG. 7 and FIG. 8 are views for explaining radiation timing of inspection-use light, and FIG. 9 is a view for explaining a method of adjusting a drive current supplied to the light source part 20.

The drive control part 10 includes, as described above, the video signal supply circuit 11, the control part 12, the R laser driver 16, the G laser driver 17 and the B laser driver 18. The video signal supply circuit 11 is controlled by the drive control part 10. Based on respective video signals 13$r$, 13$g$, 13$b$ outputted from the video signal supply circuit 11, drive currents are supplied to the respective lasers 21, 22, 23 from the respective laser drivers 16, 17, 18. Each laser 21, 22, 23 radiates the image forming light and the inspection-use light with intensity corresponding to the drive current supplied to each laser 21, 22, 23.

The control part 12 includes a memory part (not shown in the drawing) which stores various setting information and information processing programs. Such setting information contains various kinds of set current values for adjusting intensities of laser beams of three primary colors radiated from the R laser 21, the G laser 22 and the B laser 23 of the light source part 20. As the set current values, set current values It1$r$, It2$r$ for the R laser 21, set current values It1$g$, It2$g$ for the G laser 22, and set current values It1$b$, It2$b$ for the B laser 23 are named. Further, as the information processing program, a program which calculates threshold current values Ithr, Ithg, Ithb and maximum current values Iopr, Iopg, Iopb of the respective lasers 21, 22, 23 based on the BD signal 82 is named.

Further, the video signal supply circuit 11, based on a control from the control part 12, converts the image signal S into the R video signal 13$r$, the G video signal 13$g$ and the B video signal 13$b$, and outputs these signals to the laser drivers 16, 17, 18 when the scanning position of the optical scanning part 50 falls within the effective scanning range Z.

The video signal supply circuit 11 is informed of the threshold current values Ithr, Ithg, Ithb and the maximum current values Imr, Img, Imb described later from the control part 12. The video signal supply circuit 11, at timing that the brightness is 0 in the ineffective scanning range Z1 and the effective scanning range Z, generates the video signals 13r, 13g, 13b for supplying bias currents Ibr, Ibg, Ibb corresponding to the threshold current values Ithr, Ithg, Ithb to the lasers 21, 22, 23, and outputs the video signals 13r, 13g, 13b to the laser drivers 16, 17, 18 thus enhancing the responsiveness of the respective lasers 21, 22, 23.

Further, the video signal supply circuit 11 generates the video signals 13r, 13g, 13b based on the maximum current values Imr, Img, Imb informed from the control part 12. That is, the maximum current values Imr, Img, Imb are current values of the currents supplied to the lasers 21, 22, 23 when the laser beams of the respective colors exhibit maximum brightnesses, and the video signal supply circuit 11 determines conversion rates for converting the brightnesses of respective colors to the current values based on the maximum current values Imr, Img, Imb. Then, the video signals 13r, 13g, 13b are generated from the image signal S based on such determined conversion rates.

Further, the video signal supply circuit 11 is informed of the set current values It1r, It2r, It1g, It2g, It1b, It2b described later from the control part 12. The video signal supply circuit 11, based on the set current values, generates the inspection-use video signals 13r, 13g, 13b. These inspection-use video signals 13r, 13g, 13b are outputted to the respective lasers 21, 22, 23 when the scanning position of the optical scanning part 50 is assigned at a predetermined position in the ineffective scanning range Z1 outside the effective scanning range Z. Due to such constitution, the lasers 21, 22, 23 radiate the inspection-use lights in a state that the scanning position of the optical scanning part 50 is assigned at the predetermined position in the ineffective scanning range Z1.

FIG. 7 shows the relationship between the inspection-use light radiated in this manner and the scanning position of the vertical scanning part 54. As shown in the drawing, when the scanning position of the vertical scanning part 54 arrives at the first position (timing t1) from a point of time that the vertical scanning for 1 frame is started by the vertical scanning part 54 (timing t0), the inspection-use video signals 13r, 13g, 13b are outputted from the video signal supply circuit 11 during a period from the timing t1 to a point of time that the scanning position assumes the second position (timing t2). Accordingly, the inspection-use lights are radiated from the respective lasers 21, 22, 23.

FIG. 8 shows a radiation state of the inspection-use lights from the respective lasers 21, 22, 23 based on the predetermined current values It1r, It2r, It1g, It2g, It1b, It2b on six horizontal scanning lines in the horizontal scanning direction of the horizontal scanning part 52 within a range from the first position (timing t1) to the second position (timing t2).

To be more specific, the control part 12, when the scanning position of the optical scanning part 50 is on the first scanning line (between the timing t11 and the timing t12) in the horizontal scanning direction outside the effective scanning range Z (in the ineffective scanning range Z1), allows the video signal supply circuit 11 to output the R video signal 13r to the R laser driver 16 therefrom based on the set current value It1r so that the R laser driver 16 supplies the drive current of the set current value It1r to the R laser 21. Due to such constitution, the inspection-use light of the first intensity is radiated from the R laser 21. Then, the control part 12 stores a voltage level of the BD signal 82 outputted from the light detecting part 80 at this point of time in a memory part arranged inside the control part 12.

Next, the control part 12, when the scanning position of the optical scanning part 50 is on the second scanning line (between the timing t12 and the timing t13) in the horizontal scanning direction outside the effective scanning range Z, allows the video signal supply circuit 11 to output the R video signal 13r to the R laser driver 16 therefrom based on the set current value It2r so that the R laser driver 16 supplies the drive current of the set current value It2r to the R laser 21. Due to such constitution, the inspection-use light of the second intensity is radiated from the R laser 21. Then, the control part 12 stores a voltage level of the BD signal 82 outputted from the light detecting part 80 at this point of time in the memory part arranged inside the control part 12.

In the same manner, the control part 12, when the scanning position of the optical scanning part 50 is on the third scanning line (between the timing t13 and the timing t14) and the fourth scanning line (between the timing t14 and the timing t15) in the horizontal scanning direction outside the effective scanning range Z, allows the video signal supply circuit 11 to output the G video signal 13g to the G laser driver 17 therefrom based on the set current values It1g, It2g at the respective timings so that the G laser driver 17 supplies drive currents of set current values It1g, It2g to the G laser 22 at the respective timings. Due to such constitution, the inspection-use lights of the first intensity and the second intensity which differ from each other in intensity are radiated from the G laser 22. Then, the control part 12 stores voltage levels of the BD signal 82 outputted from the light detecting part 80 at the respective timings in the memory part arranged inside the control part 12.

Further, the control part 12, when the scanning position of the optical scanning part 50 is on the fifth scanning line (during the timing t15 and the timing t16) and the sixth scanning line (during the timing t16 and the timing t17) in the horizontal scanning direction outside the effective scanning range Z, allows the video signal supply circuit 11 to output the B video signal 13b to the B laser driver 18 therefrom based on the set current values It1b, It2b at the respective timings so that the B laser driver 18 supplies drive currents of set current values It1b, It2b to the B laser 23 at the respective timings. Due to such constitution, the inspection-use lights of the first intensity and the second intensity which differ from each other in intensity are radiated from the B laser 23. Then, the control part 12 stores voltage levels of the BD signal 82 outputted from the light detecting part 80 at the respective timings in the memory part arranged inside the control part 12.

Then, the control part 12, based on information on a voltage level of the BD signal 82 stored in the memory part inside the control part 12, calculates the threshold current values Ithr, Ithg, Ithb of the respective lasers 21, 22, 23 and the maximum current values Imr, Img, Imb to be supplied to the respective lasers 21, 22, 23, and adjusts drive currents to be supplied to the respective lasers 21, 22, 23 based on a result of the calculation.

Here, the relationship between the drive currents supplied to the respective lasers 21, 22, 23 and the voltage level of the BD signal 82 is expressed by the characteristic shown in FIG. 9. That is, the voltage level of the BD signal 82 outputted from the light detecting part 80 corresponds to the intensity of the inspection-use light detected by the light detecting part 80, and the intensity of the inspection-use light is determined by the current-light emission quantity characteristics of the lasers 21, 22, 23 which constitute the light sources and losses of light on the optical paths from these lasers to the light detecting part 80.

Here, the loss of light on the optical path is fixed loss rate (for example, loss of 50%) irrespective of the intensity of the inspection-use light outputted from the laser 21, 22, 23 and hence, the relationship between the drive current supplied to the laser 21, 22, 23 and the voltage level of the BD signal 82 approximates the relationship between the drive current supplied to the laser 21, 22, 23 and the light emission quantity of the laser 21, 22, 23 (the relationship shown in FIG. 3: current-light-emission quantity characteristic of light source), and assumes the relationship shown in FIG. 9.

As shown in FIG. 9, assume voltage levels of the respective BD signal 82 outputted from the light detecting part 80 when the respective drive currents of set current values It1r, It2r are supplied to the R laser 21 as Vt1r, Vt2r. Further, define a maximum value of intensity of the laser beams which arrives at the light detecting part 80, assume a voltage level of the BD signal 82 when the laser beams having the maximum-value intensity is converted by the light detecting part 80 as Vmr, and assume a threshold voltage of the R laser 21 as Vthr, the inclination θ of the characteristic indicated by a solid line can be obtained by calculating a following formula (4).

$$\theta = \tan^{-1}[(Vt2r - Vt1r)/(It2r - It1r)] \quad (4)$$

Then, by setting the voltage Vthr relative to the threshold current value Ithr to a value which can be ignored, the approximate threshold current value Ithr of the characteristic indicated by the solid line is expressed by a following formula (5).

$$Ithr \approx It1r - Vt1r/\tan\theta \quad (5)$$

From the above-mentioned formulae (4), (5), the approximate maximum voltage value Imr of the characteristic indicated by the solid line is expressed by a following formula (6).

$$Imr \approx (Vmr/\tan\theta) + Ithr \quad (6)$$

By supplying the drive current to the R laser 21 while changing the current value at two points as described above, it is possible to detect the threshold current value Ithr and the maximum current value Imr as the current-light emission quantity characteristic of the R laser 21, and the result of the detection is informed to the video signal supply circuit 11 from the control part 12. The above-mentioned calculation is merely an example, and the threshold current value Ithr and the maximum current value Imr can be detected by other calculations.

Then, the video signal supply circuit 11 outputs the R video signal 13r which is used for supplying the electric current of the threshold current value Ithr to the R laser 21 as the bias current Ib to the R laser driver 16. Further, the video signal supply circuit 11, in outputting the R video signal 13r based on the image signal S, prevents the drive current exceeding the maximum current value Imr from flowing into the R laser 21. For this end, the video signal supply circuit 11 sets the electric current supplied to the R laser 21 when an image of maximum brightness is displayed as the maximum current value Imr, determines a conversion rate when the brightness of each color is converted into a current value, and generates the video signal 13r from the image signal S based on the conversion rate.

The same goes for the G laser 22 and the B laser 23. In this manner, in the image display device of this embodiment, based on the intensities of the inspection-use lights which constitute the laser beams radiated from the lasers 21, 22, 23 which are light sources and are scanned by the optical scanning part 50, the current-light emission quantity characteristic of the lasers 21, 22, 23 (for example, threshold current values Ithr, Ithg, Ithb and the maximum current values Imr, Img, Imb supplied to the lasers 21, 22, 23) are calculated, and the drive currents supplied to the lasers 21, 22, 23 are adjusted based on the result of the calculation. Accordingly, even when the light output characteristic of the light source part 20 is changed or the loss of light in the optical path from the light source part 20 to the optical scanning part 50 is changed, the adjustment of the drive current is made such that the image forming light scanned by the optical scanning part 50 can be kept constant and hence, stable display image quality can be maintained.

As the current-light emission quantity characteristic of the laser 21, 22, 23, in place of calculating the threshold current value Ith and the maximum current value Iop, a current value which approximates the threshold current value Ith (for example, a current value slightly smaller than the threshold current value Ith) and a current value which approximates the maximum current value Iop (for example, a current value slightly smaller than the maximum current value Iop) may be used. Further, in place of calculating the maximum current value Iop, the inclination θ may be calculated, a conversion rate for converting the brightness of each color into a current value may be determined based on the inclination θ, and an electric current supplied to the laser 21, 22, 23 may be adjusted based on the conversion rate. That is, any characteristic may be used as the current-light emission quantity characteristic of the laser 21, 22, 23 provided that such a characteristic serves the adjustment of the electric current supplied to the laser 21, 22, 23 which is performed by calculation.

Further, when the maximum current value Iop exceeds a maximum rated current value of the laser 21, 22, 23 at the timing of calculating the maximum current value Iop as the current-light emission quantity characteristic of the laser 21, 22, 23, a fact that the light source is in an error state may be informed to the control part 12 from an information notifying part (not shown in the drawing).

In this embodiment, the inspection-use lights corresponding to three primary colors are sequentially radiated from the R laser 21, the G laser 22 and the B laser 23 respectively based on the inspection-use lights, and the intensities of the laser beams radiated from the respective lasers 21, 22, 23 are adjusted. However, the changes of characteristics of the respective lasers 21, 22, 23 have the fixed relationship or the like, as the inspection-use lights, laser beams of one color (for example, laser beams of one color which exhibits the highest light reception sensitivity of the light detecting part 80) may be used out of the laser beams of three primary colors. In this case, a correlation table between the laser which radiates the inspection-use light and the lasers of two other colors may be stored in a memory part arranged inside the control part 12, the current-light emission quantity characteristic of the laser which radiates the inspection-use light (for example, the threshold current value of the laser, the maximum current value supplied to the laser and the like) is calculated and, further, the current-light emission quantity characteristics, (for example, the threshold current values of the lasers, the maximum current values supplied to the lasers or the like) of the lasers of two other colors are calculated using the correlation table.

Due to such constitution, it is unnecessary to radiate the laser beams from all lasers, 21, 22, 23 and hence, the increase of the power consumption of the image display device 1 can be suppressed.

Further, in this embodiment, the inspection-use lights having intensities different from each other are radiated from all lasers 21, 22, 23 within a range of 1 frame scanning by the optical scanning part 50. However, the inspection-use lights having one intensity respectively may be radiated from the lasers 21, 22, 23 in accordance with every frame period, and the inspection-use light having intensity which differs covering a plurality of (at least two or more) frames may be radiated. For example, when the scanning position of the laser light by the optical scanning part 50 is assigned to the first to the third scanning lines in the horizontal scanning direction outside the effective scanning range Z, the inspection-use lights having one intensity respectively are radiated from the lasers 21, 22, 23, and the inspection-use light having different intensities within two frames may be radiated. Further, the inspection-use light having one intensity may be radiated from one laser out of the lasers 21, 22, 23 in accordance with every frame period, and the inspection-use light having different colors and intensities covering a plurality of (at least six or more) frames may be radiated.

In this manner, by allowing the light detecting part 80 to detect the different inspection-use lights by changing the drive currents supplied to the respective lasers 21, 22, 23 in accordance with every frame period, for example, even when a range for scanning the inspection-use lights cannot be sufficiently ensured so that the different inspection-use lights which differ in two or more horizontal scanning lines in the horizontal scanning direction cannot be radiated, it is possible to adjust the drive currents supplied to the lasers 21, 22, 23. Further, the power consumption necessary for adjusting the intensities of the laser beams radiated from the lasers 21, 22, 23 can be reduced as much as possible.

Further, in addition to the adjustment of the drive currents of the lasers 21, 22, 23 using the BD signals 82, the adjustment of radiation timing of the lasers 21, 22, 23 may be adjusted. By performing such adjustment, it is unnecessary to provide light sources in addition to the lasers 21, 22, 23 and, at the same time, it is unnecessary to additionally provide the light detecting part and hence, the image display device 1 can be miniaturized. Further, by performing the adjustment of the radiation timings using the BD signals 82 for adjusting the radiation intensities of the lasers 21, 22, 23, it is unnecessary to additionally radiate the inspection-use lights for adjusting the radiation timings and hence, the power consumption can be reduced as much as possible. For example, the timing adjustment is performed such that the inspection-use light having one intensity is radiated from one laser out of the lasers 21, 22, 23 in accordance with every frame period, and the inspection-use light having different colors or intensities extending over a plurality of (at least 6 or more) frames.

Further, by arranging the light detecting part 80 at the center position in the horizontal scanning part 52 where the scanning speed is highest, the control part 12, using the detection timing of the inspection-use light scanned at the highest scanning speed, can adjust the radiation timing of the laser beams radiated from the light source part 20 and hence, the accuracy of radiation timing adjustment of the laser beams can be enhanced.

In this embodiment, the light detecting part 80 is, as shown in FIG. 1, arranged in the relay optical system 60 and, at the same time, outside the effective scanning range Z. The arrangement position of the light detecting part 80 is, however, not limited to such a position, and the light detecting part 80 may be arranged at any position provided that the position falls within the scanning range of the optical scanning part 50 between the optical scanning part 50 and the pupil 91 of the viewer and outside the effective scanning range Z. For example, the light detecting part 80 may be arranged within the scanning range of the optical scanning part 50 between the relay optical system 60 and the pupil 91 of the viewer and outside the effective scanning range Z.

Further, in this embodiment, the light detecting part 80 is arranged outside the vertical effective scanning range Z3 within the maximum vertical scanning range W2. However, the light detecting part 80 may be arranged within the vertical effective scanning range Z3 and outside the horizontal effective scanning range Z2.

Further, the light detecting part 80 is configured to output, when the scanned inspection-use light is detected, outputs the voltage corresponding to the intensity of the inspection-use light to the control part 12 as the BD signal 82. However, the BD signal 82 is not limited to such a voltage and, for example, an electric current having a current value corresponding to the intensity of light detected by the light detecting part 80 may be outputted as the BD signal 82.

Further, in this embodiment, the retinal-scanning-type image display device has been explained as the image display device. However, the present invention is applicable to any image display device provided that the image display device forms an image by performing two-dimensional scanning of light from a light source. For example, the present invention is applicable to an image projection device (projector) which displays an image on a screen by projecting image forming light formed by scanning using an optical scanning part.

Further, the calculated threshold current value Ith is a current value supplied to each laser 21, 22, 23 as the bias current Ib, and it is not always necessary that the threshold current value Ith completely agrees with the threshold current value of the laser 21, 22, 23.

Although several embodiments of the present invention have been explained in detail in conjunction with the drawings, these embodiments are provided merely as examples, and various modifications and variations are conceivable without departing from the gist of the present invention.

What is claimed is:

1. An image display device displaying an image by a scanned light comprising:

a light source part which includes a light source for radiating a light having intensity corresponding to a supplied electric current;

an optical scanning part which is configured to perform two-dimensional scanning of the light radiated from the light source;

a drive control part which is configured to sequentially supply an electric current corresponding to an image signal to the light source when a scanning position of the light by the optical scanning part falls within an effective scanning range so as to allow the light source to sequentially radiate image forming light, and is also configured to supply an electric current to the light source when the scanning position of the light by the optical scanning part falls at a predetermined position outside the effective scanning range so as to allow the light source to radiate inspection-use light;

a light detecting part which is arranged at a predetermined position within a scanning range of the light by the optical scanning part and outside the effective scanning range; and a light blocking part which is configured to block the inspection-use light passing surroundings of the light detecting part out of the inspection-use light scanned by the optical scanning part, wherein the drive control part is configured to supply the electric current to the light source by changing a current value at two points or more when the scanning position of the light by the optical scanning part falls at the predetermined position outside the effective scanning range, is configured to calculate a current-light emission quantity characteristic of the light source based on intensity of the inspection-use light detected by the light detecting part at a point of time of supplying the electric current to the light source, and is configured to adjust the electric current supplied to the light source based on a result of the calculation.

2. The image display device according to claim 1, wherein the drive control part calculates a threshold current value of the light source and a maximum current value supplied to the light source as the current-light emission quantity characteristic of the light source.

3. The image display device according to claim 1, wherein the light source part includes a plurality of light sources which respectively corresponds to three primary colors, the drive control part is configured to supply the electric current to the respective light sources by changing the current value at two points or more when the scanning position of the light by the optical scanning part falls at the predetermined position outside the effective scanning range, is configured to calculate current-light emission quantity characteristics of the light sources for the respective light sources based on intensities of a plurality of inspection-use lights for the respective light sources detected by the light detecting part at a point of time of supplying the electric current to the light source, and is configured to adjust electric currents supplied to the respective light sources based on a result of the calculation.

4. The image display device according to claim 1, wherein the optical scanning part includes a high-speed scanning part which is configured to scan the light at a relatively high speed with respect to a first scanning direction, and a low-speed scanning part which is configured to scan the light at a relatively low speed with respect to a second scanning direction which is a direction crossing or orthogonal to the first scanning direction, and the drive control part is configured to supply electric current having different current values to the light source when the scanning position of the light by the optical tight scanning part falls on a first scanning line and a second scanning line in the first scanning direction outside the effective scanning range, and is configured to detect the inspection-use lights having different intensities by the light detecting part.

5. The image display device according to claim 1, wherein the optical scanning part includes a high-speed scanning part which is configured to scan the light at a relatively high speed with respect to a first scanning direction, and a low-speed scanning part which is configured to scan the light at a relatively low speed with respect to a second scanning direction which is a direction crossing or orthogonal to the first scanning direction, and the drive control part is configured to supply an electric current to the light source when the scanning position of the light by the optical scanning part falls on a predetermined scanning line in the first scanning direction outside the effective scanning range so as to radiate the inspection-use light from the light source, and is configured to detect the inspection-use lights having different intensities by the light detecting part by changing the electric current supplied to the light source in accordance with every frame period.

6. The image display device according to claim 1, wherein the image display device includes a relay optical system which forms an intermediate image plane to which the light scanned by the optical scanning part is converged, and the light detecting part and the light blocking part are arranged on the intermediate image plane formed in the relay optical system.

7. The image display device according to claim 6, wherein the image display device includes a pupil enlarging element which is arranged on the intermediate image plane formed in the relay optical system and is configured to divide or diffuse light incident on the pupil enlarging element, and the light detecting part and the light blocking part are arranged in the pupil enlarging element or around the pupil enlarging element.

8. The image display device according to claim 1, wherein the image display device is configured to display an image by projecting the image forming light scanned by the optical scanning part to at least one retina of a viewer.

9. The image display device according to claim 1, wherein the image display device is configured to display an image by projecting the image forming light scanned by the optical scanning part on a screen.

* * * * *